US009984301B2

(12) United States Patent
Dos Santos Mendonca

(10) Patent No.: US 9,984,301 B2
(45) Date of Patent: May 29, 2018

(54) NON-MATCHING FEATURE-BASED VISUAL MOTION ESTIMATION FOR POSE DETERMINATION

(71) Applicant: QUALCOMM Incorporated, San Diego, CA (US)

(72) Inventor: Paulo Ricardo Dos Santos Mendonca, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 15/131,404

(22) Filed: Apr. 18, 2016

(65) Prior Publication Data

US 2016/0307334 A1 Oct. 20, 2016

Related U.S. Application Data

(60) Provisional application No. 62/149,850, filed on Apr. 20, 2015.

(51) Int. Cl.
*G06T 7/00* (2017.01)
*G06T 7/20* (2017.01)
*G06K 9/20* (2006.01)
*G06K 9/46* (2006.01)
(Continued)

(52) U.S. Cl.
CPC ............. *G06K 9/20* (2013.01); *G06K 9/46* (2013.01); *G06T 7/246* (2017.01); *G06T 7/73* (2017.01); *G06T 7/97* (2017.01); *G06T 2207/30244* (2013.01)

(58) Field of Classification Search
CPC . G06K 9/20; G06K 9/46; G06T 7/246; G06T 7/73; G06T 7/97; G06T 2207/30244; G06T 7/20
See application file for complete search history.

(56) References Cited

U.S. PATENT DOCUMENTS

| 7,489,334 B1 | 2/2009 | Pickering et al. |
| 7,817,723 B2 | 10/2010 | Wiegand et al. |
| 9,060,175 B2 | 6/2015 | Wang et al. |

(Continued)

FOREIGN PATENT DOCUMENTS

WO 2015013534 A1 1/2015

OTHER PUBLICATIONS

Zhu. "Self-Recalibration of the Camera Pose via Homography." IEEE International Conference on Intelligent Computing and Intelligent Systems, Oct. 29, 2010, pp. 493-497.*
Lucchese. "Closed-form Pose Estimation from Metric Rectification of Coplanar Points." IEE Proceedings—Vision, Image and Signal Processing, vol. 153, No. 3, Jun. 2006, pp. 364-378.*
Fischler M.A., et al., "Random Sample Consensus: A Paradigm for Model Fitting with Applications to Image Analysis and Automated Cartography," Communications of the ACM, Jun. 1981, vol. 24 (6), pp. 381-395.
Broder A.Z, "How Hard is it to Marry at Random? (On the approximation of the permanent)," Proceedings of the Eighteenth Annual ACM Symposium on Theory of Computing, STOC '86, Jan. 1, 1986 (Jan. 1, 1986), pp. 50-58, XP055284879, New York, New York, USA DOI: 10.1145/12130.12136 ISBN: 978-0-89791-193-1.

(Continued)

*Primary Examiner* — Jon Chang
(74) *Attorney, Agent, or Firm* — Muncy, Geissler, Olds & Lowe, P.C.

(57) ABSTRACT

A method for determining a pose of a camera includes obtaining both a first image of a scene and a second image of the scene, where both the first and second images are captured by the camera. A first set of features is extracted from the first image and a second set of features is extracted from the second set of features. The method includes calculating a value of a visual-motion parameter based on the first set of features and the second set of features without matching features of the first set with features of the second set. The method also includes determining the pose of the camera based, at least, on the value of the visual motion parameter.

23 Claims, 7 Drawing Sheets

(51) Int. Cl.
    *G06T 7/73*           (2017.01)
    *G06T 7/246*         (2017.01)

(56) References Cited

U.S. PATENT DOCUMENTS

| | | | |
|---|---|---|---|
| 2012/0075343 A1* | 3/2012 | Chen | G09G 5/397 345/633 |
| 2012/0219188 A1* | 8/2012 | Kurz | G06K 9/3216 382/103 |
| 2014/0003661 A1* | 1/2014 | Kwon | H04N 5/23293 382/103 |
| 2014/0064624 A1* | 3/2014 | Kim | G06K 9/0063 382/201 |
| 2014/0119593 A1* | 5/2014 | Filler | G06T 1/0064 382/100 |
| 2015/0049955 A1* | 2/2015 | Stoeffler | G06K 9/6202 382/220 |
| 2016/0018643 A1 | 1/2016 | Cho et al. | |

OTHER PUBLICATIONS

Dellaert F., et al., "Monte Carlo EM for data-association and its Applications in Computer Vision," Jan. 1, 2001 (Jan. 1, 2001), XP055284662, ISBN: 978-0-493-53765-8 Retrieved from the Internet: URL:http://reports-archive.adm.cs.cmu.edu/anon/anon/usr0/ftp/home/ftp/2001/CMU-CS-01-153.pdf abstract p. 11-p. 13 p. 23 p. 26-p. 38 p. 55-p. 56 p. 66 p. 91 p. 126 p. 196-p. 197.
International Search Report and Written Opinion—PCT/US2016/028269—ISA/EPO—dated Jul. 12, 2016.

* cited by examiner

NON-MATCHING FEATURE-BASED VISUAL MOTION ESTIMATION FOR POSE DETERMINATION

CROSS-REFERENCE TO RELATED APPLICATION

The present application for patent claims the benefit of U.S. Provisional Application No. 62/149,850, entitled "NON-MATCHING FEATURE-BASED MOTION ESTIMATION," filed Apr. 20, 2015, assigned to the assignee hereof, and expressly incorporated herein by reference in its entirety.

FIELD OF DISCLOSURE

This disclosure relates generally to computer vision based motion estimation applications, and in particular, but not exclusively, relates to determining pose based on visual motion without feature matching.

BACKGROUND

A wide range of electronic devices, including mobile wireless communication devices, personal digital assistants (PDAs), laptop computers, desktop computers, digital cameras, digital recording devices, and the like, employ computer vision techniques to provide versatile imaging capabilities. These capabilities may include functions that assist users in recognizing landmarks, identifying friends and/or strangers, and a variety of other tasks.

A challenge to enabling Augmented Reality (AR) on mobile phones or other mobile platforms is the problem of estimating camera poses in real-time. Pose estimation for AR applications has very demanding requirements: it must deliver full six degrees of freedom, give absolute measurements with respect to a given coordinate system, be very robust and run in real-time. Of interest are methods to compute camera pose using computer vision (CV) based approaches.

Some conventional augmented reality systems attempt to determine pose by performing visual motion estimation by tracking the motion of features extracted from image pixel data. There are, however, a number of issues, such as computational complexity, that make it difficult to implement known visual-motion techniques on a mobile platform.

Visual motion estimation may be described as determining how a camera or a set of points has moved from one position to another. A key component typically present in conventional visual-motion methods is how to obtain matches between features extracted from successive or subsequent images. However, feature matching is a computationally expensive and error-prone procedure, often addressed through complex feature descriptors (e.g., SIFT or SURF) combined with RANSAC. Such conventional methods typically samples (i.e., tries) many possible feature matches until, if lucky, a sufficiently good set of matches is found.

SUMMARY

Aspects of the present disclosure include a method, a mobile device, and computer-readable medium for determining a pose of a camera.

For example, according to at least one aspect, a method for determining a pose of a camera includes obtaining both a first image of a scene and a second image of the scene, where both the first and second images are captured by the camera. A first set of features is extracted from the first image and a second set of features is extracted from the second set of features. The method includes calculating a value of a visual-motion parameter based on the first set of features and the second set of features without matching features of the first set with features of the second set. The method also includes determining the pose of the camera based, at least, on the value of the visual motion parameter.

According to another aspect, a mobile device includes, a camera, memory adapted to store program code, and a processing unit coupled to the memory to access and execute instructions included in the program code. The instructions are configured to direct the mobile device to: (i) capture a first image of a scene with the camera; (ii) capture a second image of the scene with the camera; (iii) extract a first set of features from the first image; (iv) extract a second set of features from the second image; (v) calculate a value for a visual-motion parameter based on the first set of features and the second set of features without matching features of the first set with features of the second set; and (vi) determine a pose of the camera based, at least, on the value of the visual-motion parameter.

According to yet another aspect, a non-transitory computer-readable medium is provided. The non-transitory computer-readable medium includes program code stored thereon for determining a pose of a camera. The program code includes instructions to: (i) obtain a first image of a scene, wherein the first image is captured by the camera; (ii) obtaining a second image of a scene, wherein the second image is captured by the camera; (iii) extract a first set of features from the first image; (iv) extract a second set of features from the second image; (v) calculate a value for a visual-motion parameter based on the first set of features and the second set of features without matching features of the first set with features of the second set; and (vi) determine the pose of the camera based, at least, on the value of the visual-motion parameter.

According to another aspect, a mobile device includes means for obtaining a first image of a scene and means for obtaining a second image of a scene, wherein the first and second images are captured by a camera of the mobile device. The mobile device also includes means for extracting a first set of features from the first image as well as means for extracting a second set of features from the second image. Further included in the mobile device is a means for calculating a value for a visual-motion parameter based on the first set of features and the second set of features without matching features of the first set with features of the second set and a means for determining the pose of the camera based, at least, on the value of the visual-motion parameter.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
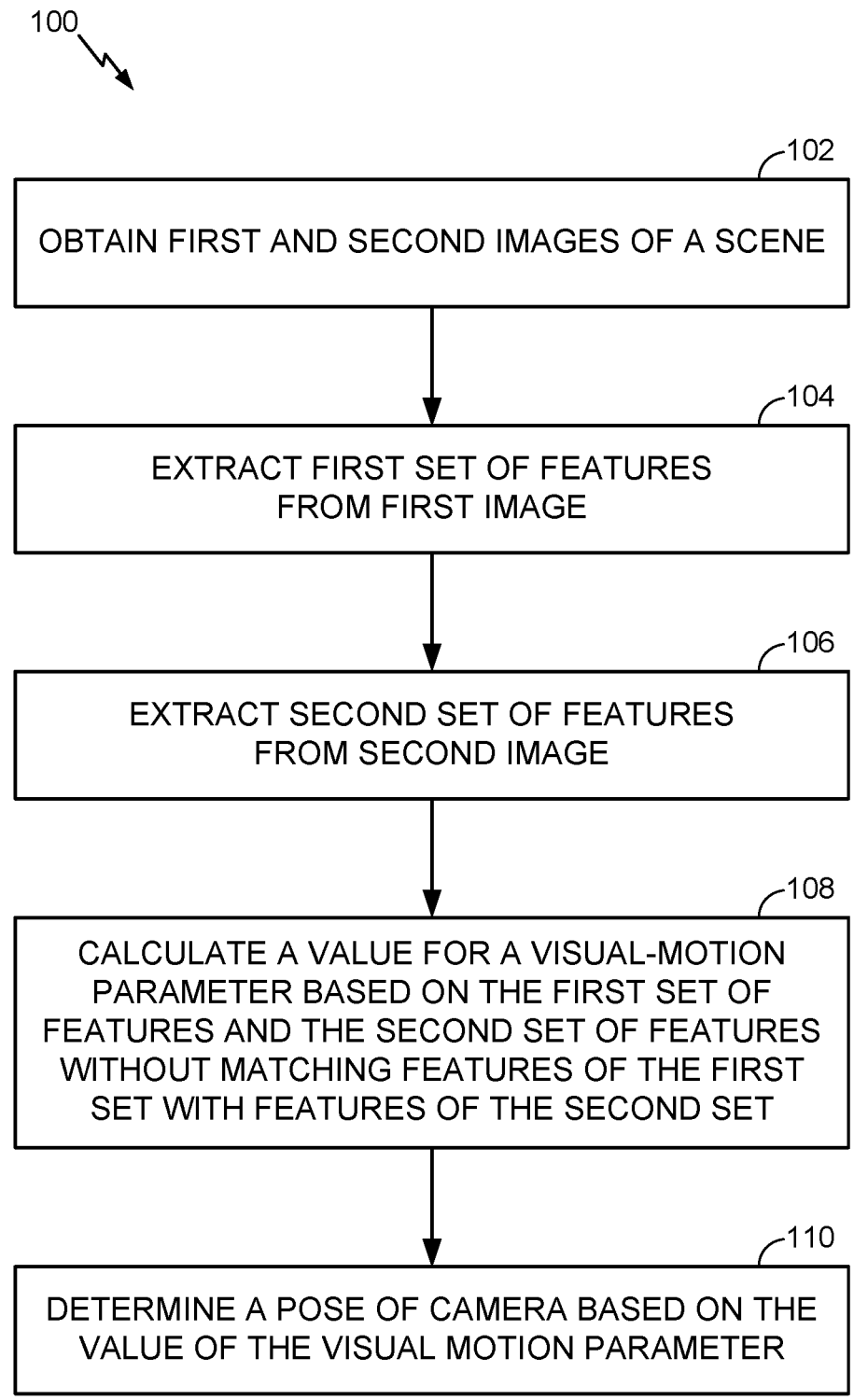
FIG. 1 is a flowchart illustrating an example process of determining a pose of a camera.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Feature-based methods have a prominent role in geometric computer vision. Besides the availability of features, these methods further rely on the assumption that feature correspondences are available, with the caveat that potential outliers should be dealt with via procedures from robust statistics. In accordance with the teachings of the present disclosure, a process of pose determination is provided that eliminates the requirement for the initial establishment of feature correspondences. In one aspect, this is accomplished by carrying out the marginalization over the elements of a permutation group of feature correspondences.

For example, certain aspects of at least some of the processes discussed herein bypass the search for feature matches by marginalizing (e.g., averaging) over all potential matches (and mismatches) between two feature sets. A naive approach would be faced with an insurmountable combinatorial problem. Accordingly, the processes described herein address this issue through the use of an approximation process that gives an excellent approximation for the marginalization (e.g., averaging) procedure. Besides doing away with the requirement of establishing feature matches, aspects of the present processes can also be optionally configured to handle outliers, i.e., features that don't match any other feature and are simply spurious input points.

In general, aspects of the present disclosure include, first creating a matrix whose entries contain the cost of matching any given feature from set X (e.g., rows) to any given feature in set Y (e.g., columns) for a given value θ of a visual-motion parameter of interest (e.g., rotation and translation, a "fundamental matrix," a "homography," an "affine transformation," etc.). The matrix may also include special entries for potential outliers, which could, in principle, be any feature. Marginalization over feature matches may include adding all permutations of the product of unique row and column elements, which would lead to a combinatorial explosion. However, aspects discussed herein provide for a process that can produce excellent estimates for the result of this operation, thereby providing a cost function that can be minimized so as to optimize the value θ. Multiple implementations of these processes are possible to obtain estimates of the value θ of the visual motion parameter under very harsh conditions (i.e., large number of outliers, noisy data, poor initialization, etc.)

By way of example, FIG. 1 is a flowchart illustrating a process 100 of determining a pose of a camera that includes visual-motion estimation without the implementation of feature matching for the purposes of deriving a value of the visual-motion parameter. Process block 102 includes obtaining first and second images of a scene. In one example, the first and second images are images of the scene captured by a camera taken from distinct viewpoints, such that motion of the camera and/or motion of the scene, itself, can be determined. Process block 104 includes the extraction of a first set of features from the first image and process block 106 includes the extraction of a second set of features from the second image.

Figure 2:
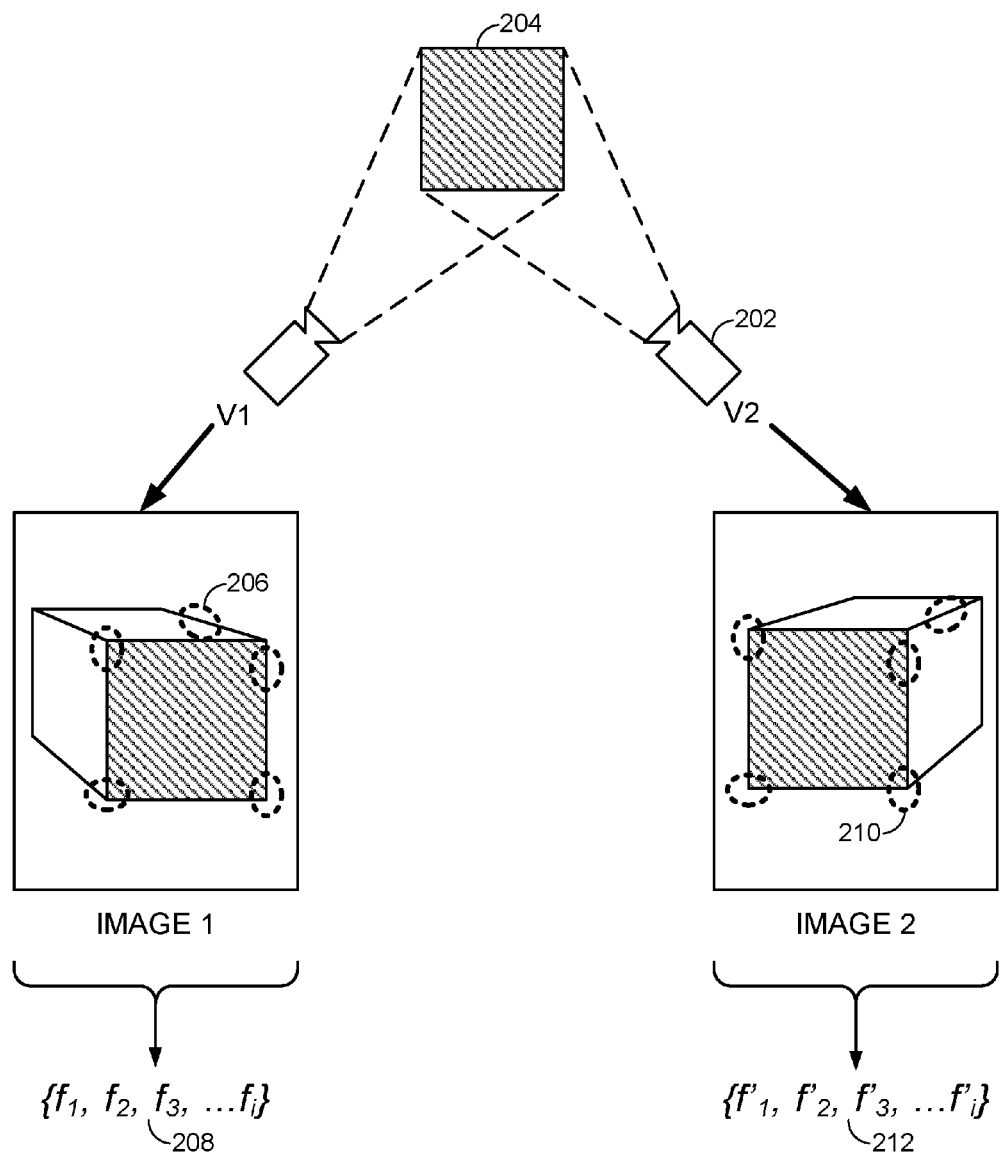
FIG. 2 is a diagram illustrating the capturing of several images from distinct viewpoints and the subsequent extraction of features.

Referring now to FIG. 2, is a diagram illustrating the capturing of several images from distinct viewpoints. For example, FIG. 2 illustrates a camera 202 capturing several images (e.g., image 1 and image 2) of a scene that includes one or more objects 204 from several distinct viewpoints (e.g., V1 and V2). Although, FIG. 2 only illustrates two images taken from two distinct viewpoints, aspects of the present disclosure may include capturing two or more images. In some examples, various positional attributes of the camera 202 may have changed between the capturing of image 1 and the capturing of image 2, such as distance, pitch, and yaw. In other examples, the position of camera 202 remains the same while the positional attributes of object 204 have changed. In yet another example, positional attributes of both camera 202 and object 204 have changed between image 1 and image 2.

FIG. 2 also illustrates the extracting of features from the captured images (i.e., process blocks 104 and 106). In one example, feature extraction includes applying a Laplacian of Gaussian (LoG) or a Difference of Gaussians (DoG) based feature detector, such as the Scale Invariant Feature Transform (SIFT) algorithm, to each image in order to extract respective sets of features. By way of example, FIG. 2 illustrates a first set of features 208 that includes each of the features 206 extracted from image 1, while the second set of features 212 includes each of the features 210 extracted from image 2. A feature, as used herein, may generally refer to anything detected that is capable of being matched between at least two images, where if a sufficient number of those matches are found, then allows the computation of a visual motion parameter, such as translation or rotation. In one example, a feature may include a line, edge, or ridge. In another example, a feature may include a localized interest point, such as a corner, blob, or point. In yet another example, a feature includes a point of interest or "keypoint location" and a "descriptor" of the region surrounding the interest point. As will be described in more detail below, although extracted features used herein are capable of being matched between images, embodiments discussed herein avoid the process of actually finding matches (e.g., correspondences) between such features in order to determine the value of a visual motion parameter.

Returning now back to FIG. 1, process 100 then proceeds to process block 108, where a value of the visual-motion parameter is calculated based on the first and second sets of features, but without matching features of the first set with features of the second set. The visual-motion parameter calculated may include one or more of a homography, a fundamental matrix, a rigid transformation between two sets of points, a rotation, a translation, essential matrices, pure rotation, affine transformation, and projective transformation. In process block 110, the pose of the camera (e.g., camera 202 of FIG. 2) is determined based, at least, on the value of the visual-motion parameter.

Figure 3:
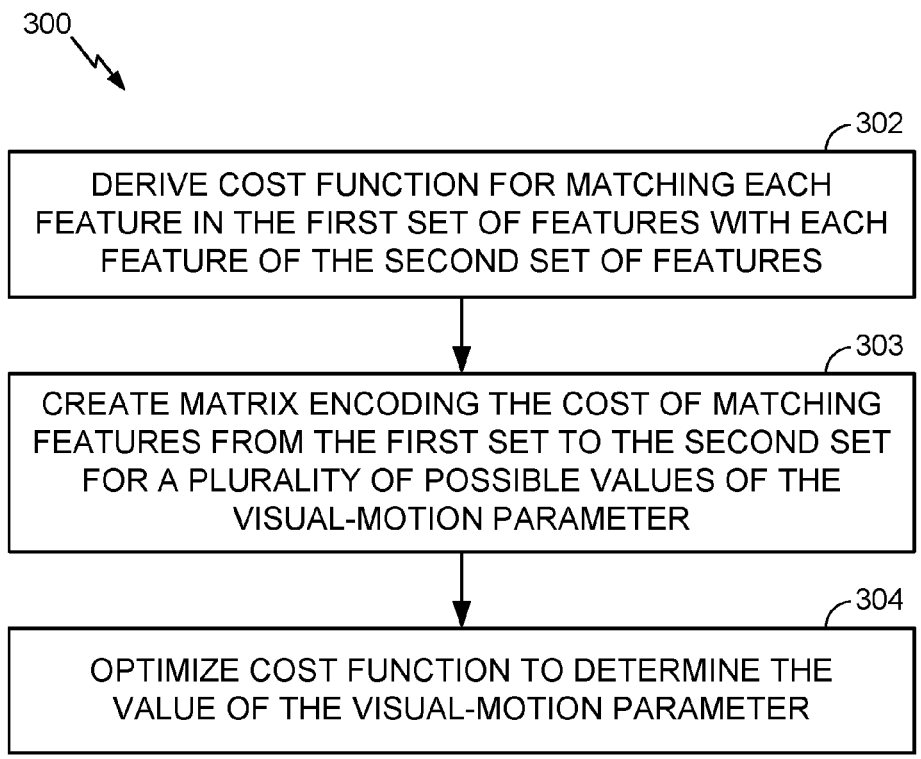
FIG. 3 is a flowchart illustrating an example process of calculating a value for a visual-motion parameter.

FIG. 3 is a flowchart illustrating an example process 300 of calculating a value for the visual-motion parameter. Process 300 is one possible implementation of process block 108 of FIG. 1. Process block 302 includes deriving a cost function for matching each feature in the first set of features with each feature of the second set of features. In one example, the derived cost function is the cost of determining every plausible match between the two sets of features. Next, in process block 303, a matrix is created that encodes the cost of matching features from the first set of features to the features of the second set of features for a plurality of possible values of the visual-motion parameter. For example, matrix may include the features from the first set arranged in rows and features from the second set arranged in columns, where the matrix encodes the cost of matching features from the first set (e.g., rows) to the features in the second set (e.g., columns) for any given value of the visual-motion parameter. Thus, creating a matrix may represent all possible match costs given $\theta$ (i.e., value of the visual-motion parameter). An optional step of adding special entries may be included to deal with outliers. That is, the matrix may be augmented in the row, columns, or both, with additional costs accounting for the possibility that features in either the first or second sets do not have a match. A further optional step may be included if information on matches is already available, that includes making the matrix sparse.

In one embodiment, the deriving the cost function in process block 302 may include determining a permanent of the matrix. An approximation method may be used to estimate the permanent of the matrix.

Next, in process block 304, the cost function is optimized, where the determination of the value of the visual-motion parameter may be then made based on the optimized cost function. In one example, optimizing the cost function includes optimize $\theta$ by maximizing the permanent of the matrix, where the permanent looks like the determinant, without negative signs and is equivalent to marginalization over matches.

Figure 4A:
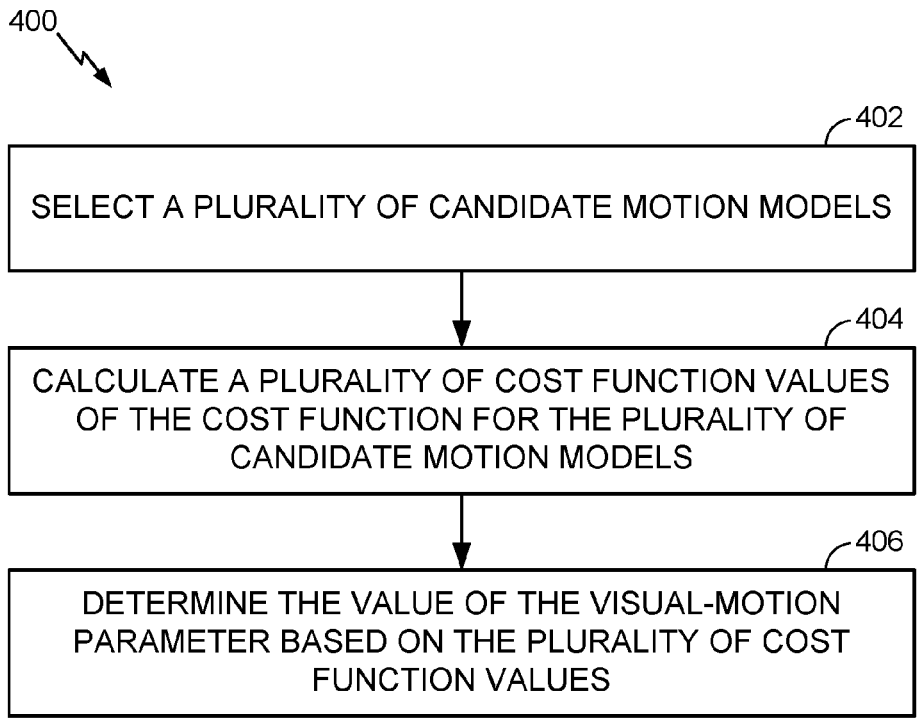
FIG. 4A is a flowchart illustrating a process of optimizing a cost function.
Figure 4B:
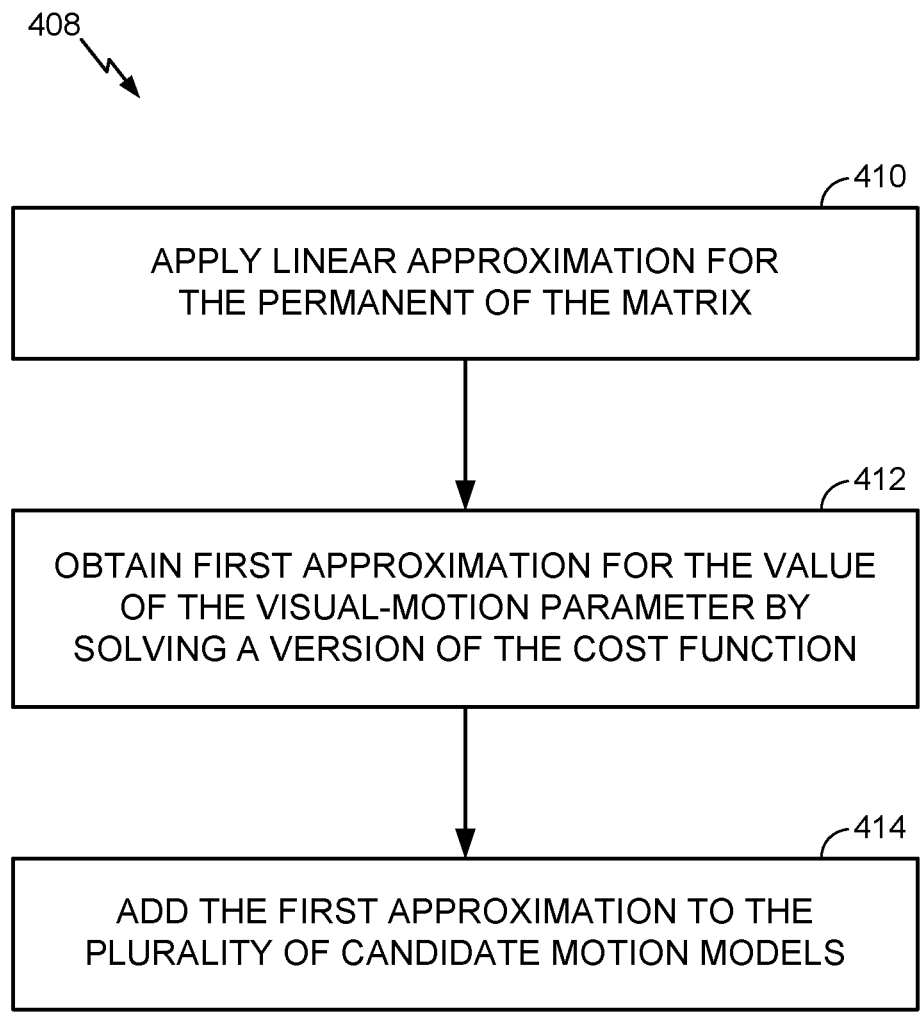
FIG. 4B is a flowchart illustrating a process of selecting a plurality of candidate motion models.

FIG. 4A is a flowchart illustrating an example process 400 of optimizing a cost function. Process 400 is one possible implementation of process block 304 of FIG. 3. Process block 402 includes selecting a plurality of candidate motion models for evaluation. A candidate motion model is a model which describes how the images of the scene might have changed for different possible motions of the object. An example of a candidate motion model may be assumed for determining motion of a planar scene, where the candidate motion model is a 2D transformation of an image of the scene (e.g., the first image). Even still, an example of a candidate motion model may be assumed when determining motion of a 3D scene, where the candidate motion model defines its aspect depending on its 3D position and orientation. FIG. 4B is a flowchart illustrating a process 408 of selecting a plurality of candidate motion models. Process 408 is one possible implementation of process block 402 of FIG. 4A. In process block 410, a linear approximation is applied for the permanent of the matrix (e.g., process block 303 of FIG. 3). Next, in process block 412, a first approximation is obtained for the value of the visual-motion parameter by solving a version (e.g., a simplified version) of the cost function. In process block 414, the first approximation is added to the plurality of candidate motion models for which the cost function will be evaluated. As will be apparent, process 408 may be repeated for several approximations for the plurality of values of the visual-motion parameter.

Returning now to FIG. 4A, in process block 404 a cost function value is calculated for each of the plurality of candidate motion models (i.e., the plurality of candidate motion models selected in process block 402). Thus, process block 404 includes calculating the cost of determining every plausible match between the two sets of features for each candidate motion model. Next, in process block 406, the value of the visual-motion parameter is determined based on the plurality of cost function values. In one example, determining the value of the visual-motion parameter is determined based on the best calculated cost function value associated with the value. In one example, the lowest cost function value is the best cost function value.

Processes 100, 300, and 400, described above, provide a general overview of example processes for determining a pose of a camera based on a value of visual-motion parameter without the need for feature matching. Further details for derivation of the cost function, as well example optimization procedures are described as follows.

In one example, let $\theta$ be a value of the visual-motion parameter, and let X and Y be finite collections of features observed on two distinct images (e.g., X may correspond to the first set of features 208 extracted from the first image and Y may correspond to the second set of features 212 extracted from the second image). Accordingly, aspects discussed herein may attempt to maximize a likelihood function $p(X, Y|\theta)$.

In one aspect, as a measure to simplify the process, it may be assumed that the cardinalities of X and Y are the same, where their common value may be denoted by N. It is further assumed that there is an absence of outliers. Another assumption that may be made is the existence of a likelihood function $p((x_i, y_{o(i)})_{i=1}^N|\theta)$ where for each I=1, ..., N the pair $(x_i, y_{o(i)})$ is a correspondence between features $x_i \in Y$. $\sigma$ is an arbitrary element of the (discrete) permutation group $S_N$. The derivation of the likelihood function a likelihood function $p(X, Y|\theta)$ is then as follows:

Marginalization Over Point Matches:

$$p(X, Y | \theta) = \sum_{\sigma \in S_N} p(X, Y | \sigma, \theta) P(\sigma | \theta) \quad \text{(EQ. 1)}$$

$$= \sum_{\sigma \in S_N} p((x_i, y_{\sigma(i)})_{i=1}^N | \theta) P(\sigma | \theta) \quad \text{(EQ. 2)}$$

"Labeling Independence":

$$= \frac{1}{N!} \sum_{\sigma \in S_N} p((x_i, y_{\sigma(i)})_{i=1}^N | \theta) \quad \text{(EQ. 3)}$$

Standard independence assumption:

$$= \frac{1}{N!} \sum_{\sigma \in S_N} \prod_{i=1}^N p((x_i, y_{\sigma(i)}) | \theta) \quad \text{(EQ. 4)}$$

The right-hand side in equation (1) simply re-writes the left-hand side in the presence of σ as a nuisance parameter. In equation (2) it is made explicit that a given choice of σ is equivalent to a choice of correspondences between the features in X and Y. "Labeling independence," used to obtain equation (3), merely states the fact that in the absence of information about the features, $(P(\sigma|\theta)$ does not carry dependence on X or Y). In one example, equations (1-4) are possible implementations of the cost function discussed above with reference to process block 302 of process 300 in FIG. 3.

Next, the marginalization over matches may be determined by defining an N×N matrix A, such that $A_{i,j} := p((x_i, y_j)|\theta)$, where:

$$\det(A) := \Sigma_{\sigma \in S_N} \text{sign}(\sigma) \Pi_i^N p((x_i, y_{\sigma(i)})|\theta) \quad \text{(EQ.5)}$$

which but for the factor 1/N! and the term sign(σ) is the same in equation (4). The similarity between the determinant of A and equation (4) is not a coincidence: For any given N×N matrix A the expression:

$$\text{per}(A) := \Sigma_{\sigma \in S_N} \Pi_i^N A_{i,\sigma(i)}, \quad \text{(EQ.6)}$$

defines the permanent of A, and both the determinant and the permanent being particular cases of the immanant of a square matrix. The determinant can be computed in polynomial time on N, the fastest algorithm for the computation of the permanent, even in the simpler case of (0, 1)-matrices, runs in $O(N2^N)$, and the problem has been shown to belong to the #P-complete computational-complexity class. Roughly speaking the #P-complete class is to counting problems ("how many are there?") as the NP-complete is to decision problems ("is there any?").

Exact computation of the permanent may be impractical for values of N in the hundreds, especially for visual-motion applications. Thus, aspects of the present disclosure may implement an approximation method to estimate the permanent of the matrix. A first example approximation method, is based on approximate counting of perfect matches of bipartite graphs, while another approximation method is based on unbiased estimators of the permanent using determinants.

For example, an approximation method may include approximations via counting schemes that is based on the equivalence between the computation of the permanent for 0-1 matrices and the counting of perfect matches of a bipartite graph. The central idea of such methods is to interpret each value of σ in equation (6) as a perfect match of the bipartite graph with vertices in X and Y; by uniformly sampling over perfect matches and counting the relative frequency of the event that a sampled match is a subset to the edge set of the graph, an estimator for the permanent is produced.

Generalization to any matrix with non-negative entries is done through re-weighting each sample according to the weight of the edges, but even in the original problem a method is used to ensure the uniformity of the sampling.

Another method for approximating the permanent uses determinants. This method utilizes the similarity between the permanent and the determinant, aiming at producing a matrix B whose determinant can be used to compute an unbiased estimator of the permanent of another matrix A.

The formulation of equations (1-6) discussed above assumes feature sets with the same cardinality, and, although it does not commit to any specific feature correspondence, it also does not admit the presence of outliers, i.e., features that do not match any feature in the other set. These two problems may be addressed jointly, since by having sets of different cardinality it is guaranteed that at least some features of the set with larger cardinality will not have correspondences.

For example, define the sets X' and Y', whose elements are symbols $x_i$ and $y_j$ for i=1+M, . . . , M+N and j=N+1, . . . , M+N. For i=1, . . . , M, a feature $x_i \in X$ is an outlier if it does not have a correspondence in Y, and this may be represented by pairing $x_i$ with the symbol $y_{i+N}$ in Y'. In addition, the probability density of xi may be represented when this feature is an outlier as $p(x_i, y_i+N|\theta)$. An equivalent operation can be carried out with elements of Y and X' to indicate outliers in Y, thereby defining, for j=1, . . . , N, the probability density $p(x_{j+M}; y_j|\theta)$ of $y_j$ when this feature is an outlier.

Figure 5:
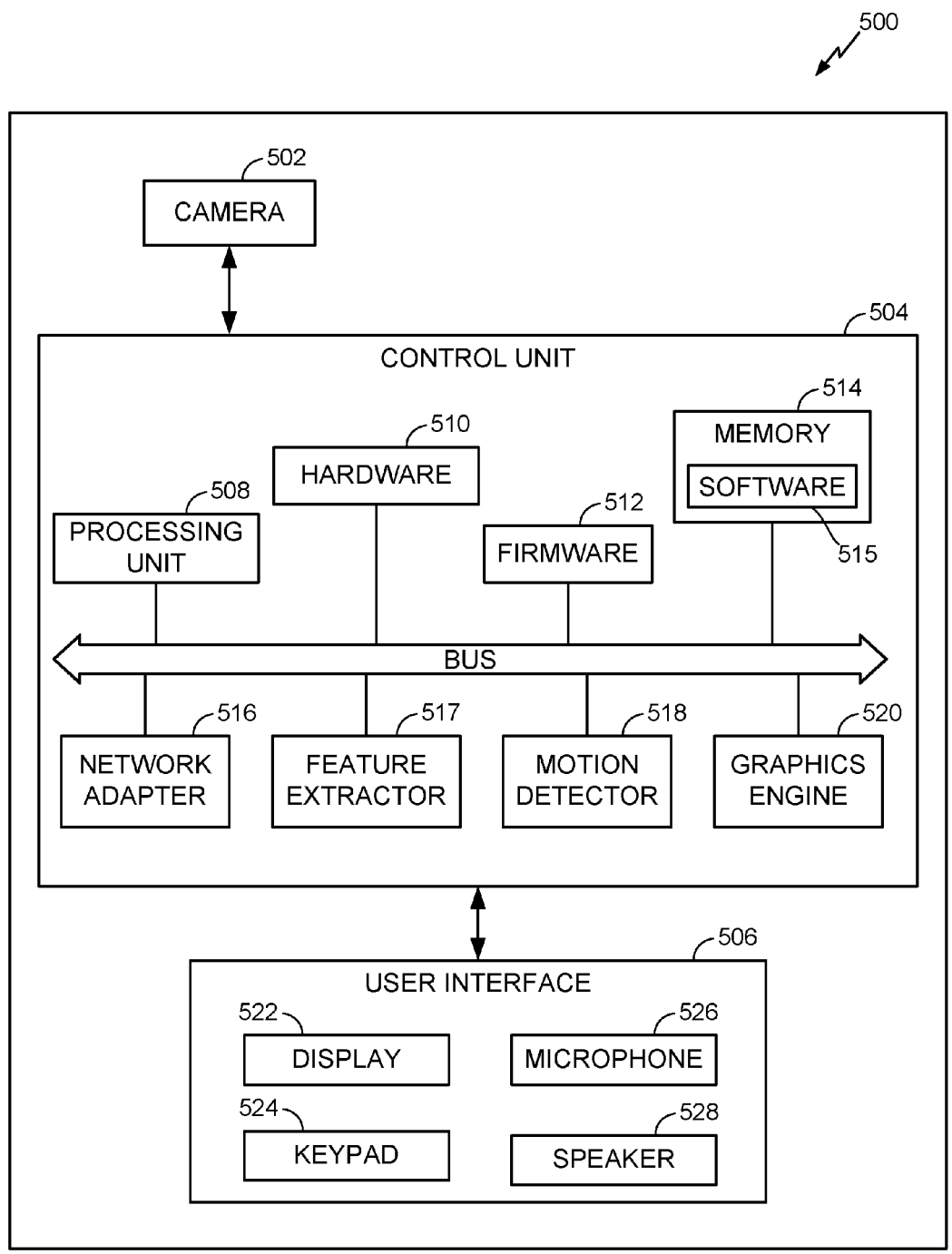
FIG. 5 is a block diagram illustrating a mobile device configured to perform the processes discussed herein.

FIG. 5 is a functional block diagram illustrating a mobile device 500 capable of performing the processes discussed herein. In one aspect mobile device 500 is a computer capable performing pose determination based on a value of a visual-motion parameter without the need for feature matching, such as process 100, described above. mobile device 500 may optionally include a camera 502 as well as an optional user interface 506 that includes the display 522 capable of displaying images captured by the camera 502. User interface 506 may also include a keypad 524 or other input device through which the user can input information into the mobile device 500. If desired, the keypad 524 may be obviated by integrating a virtual keypad into the display 522 with a touch sensor. User interface 506 may also include a microphone 526 and speaker 528.

Mobile device 500 also includes a control unit 504 that is connected to and communicates with the camera 502 and user interface 506, if present. The control unit 504 accepts and processes images received from the camera 502 and/or from network adapter 516. Control unit 504 may be provided by a processing unit 508 and associated memory 514, hardware 510, firmware 512, software 515, and graphics engine 520.

Control unit 504 may further include a feature extractor 517 and motion detector 518. Feature extractor 517 may be configured to perform one or more feature extraction procedures, such as described above with reference to process blocks 104 and 106 of FIG. 1. Motion detector 518 may be configured to perform one or more of the processes 100, 200, or 300, described above for pose determination, including calculating a value of the visual-motion parameter without the need for feature matching. Processing unit 508, feature extractor 517, and motion detector 518 are illustrated separately for clarity, but may be a single unit and/or implemented in the processing unit 508 based on instructions in the software 515 which is run in the processing unit 508. Processing unit 508, as well as the feature extractor 517 and motion detector 518 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with apparatus 500, and is not to be limited to any particular type of memory or number of memories, or type of media upon which memory is stored.

The processes described herein may be implemented by various means depending upon the application. For example, these processes may be implemented in hardware 510, firmware 512, software 515, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 515 and executed by the processing unit 508. Memory may be implemented within or external to the processing unit 508.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
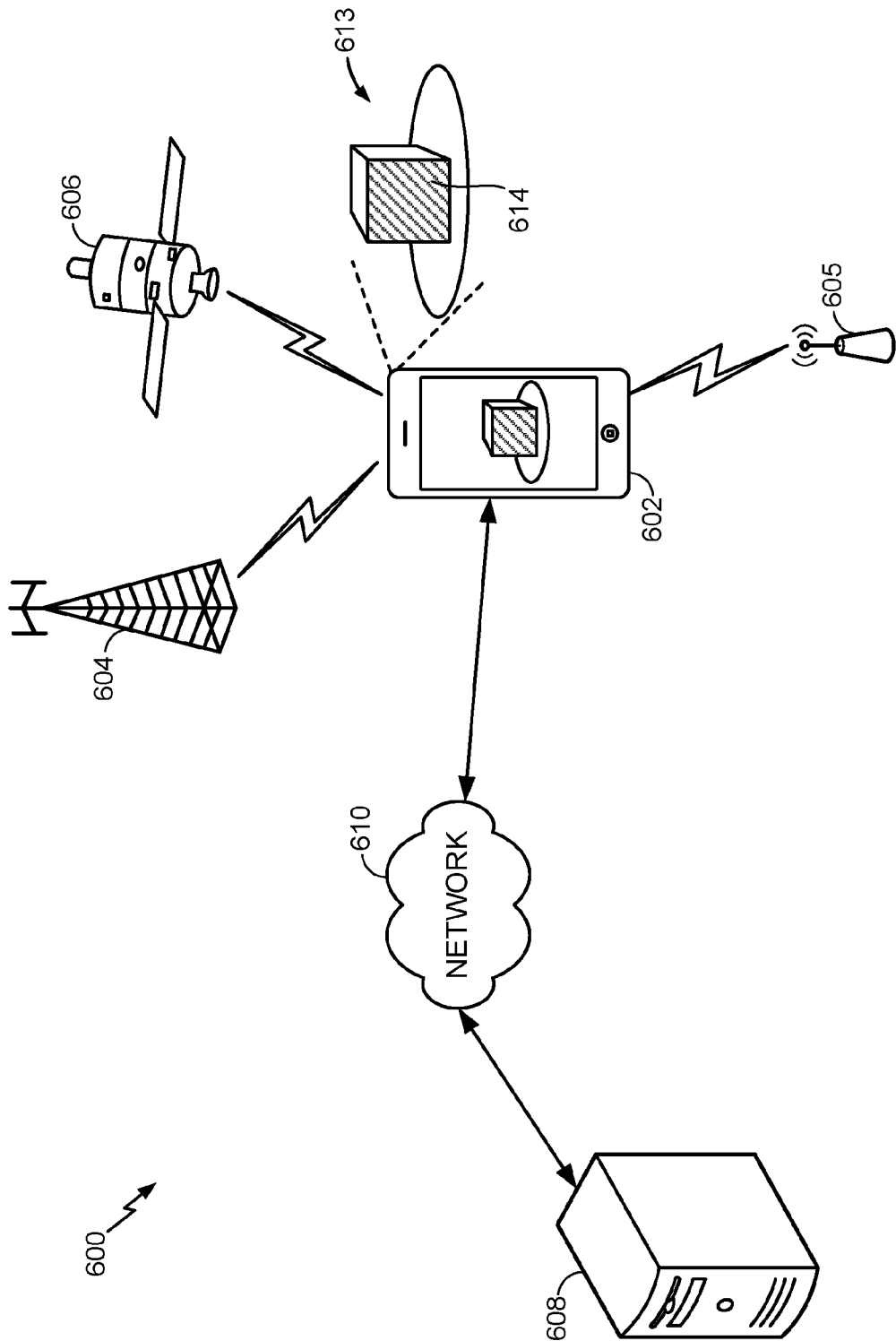
FIG. 6 is a functional block diagram of a system for determining a pose of a mobile device.

FIG. 6 is a functional block diagram of a system 600 for determining a pose of a mobile device 602. As shown, system 600 includes an example mobile device 602 that includes a camera (not shown in current view) capable of capturing images of a scene 613 that includes one or more objects 614.

The mobile device 602 may include a display to show images captured by the camera. Mobile device 500 of FIG. 5 is one possible implementation of mobile device 602. The mobile device 602 may also be used for navigation based on, e.g., determining its latitude and longitude using signals from a satellite positioning system (SPS), which includes satellite vehicle(s) 606, or any other appropriate source for determining position including cellular tower(s) 604 or wireless communication access points 605. The mobile device 602 may also include orientation sensors, such as a digital compass, accelerometers or gyroscopes, that can be used to determine the orientation of the mobile device 602.

As used herein, a mobile device refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. In addition a "mobile device" may also include all electronic devices which are capable of augmented reality (AR), virtual reality (VR), and/or mixed reality (MR) applications. Any operable combination of the above are also considered a "mobile device."

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 6906. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 602 is not limited to use with an SPS for position determination, as position determination techniques may be implemented in conjunction with various wireless communication networks, including cellular towers 604 and from wireless communication access points 605, such as a wireless wide area network (WWAN), a wireless local area network (WLAN), a wireless personal area network (WPAN). Further the mobile device 602 may communicate with one or more servers 608 to aid in pose determination and/or calculation of the value of the visual-motion parameter, using various wireless communication networks via cellular towers 604 and from wireless communication access points 605, or using satellite vehicles 606 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As shown in FIG. 6, system 600 includes mobile device 602 capturing an image of scene 613 for the purposes of determining a pose of the camera of mobile device 602. As illustrated, the mobile device 602 may access a network 610, such as a wireless wide area network (WWAN), e.g., via cellular tower 604 or wireless communication access point 605, which is coupled to a server 608. Mobile device 500 of FIG. 5 is one possible implementation of server 608. While FIG. 6 shows one server 608, it should be understood that multiple servers may be used. Mobile device 602 may perform the pose determination by itself or it may transmit image data to server 608, where pose determination and/or the determination of the value of the visual-motion parameter may be performed by server 608. The mobile device 602 may extract features from at least two captured images, and then perform the pose determination process, such as process 100, locally at the mobile device 602. If desired, however, the pose determination may be performed by the server 608 (or other server), where either the images themselves or the extracted features from the captured images are provided to the server 608 by the mobile device 602.

Figure 7:
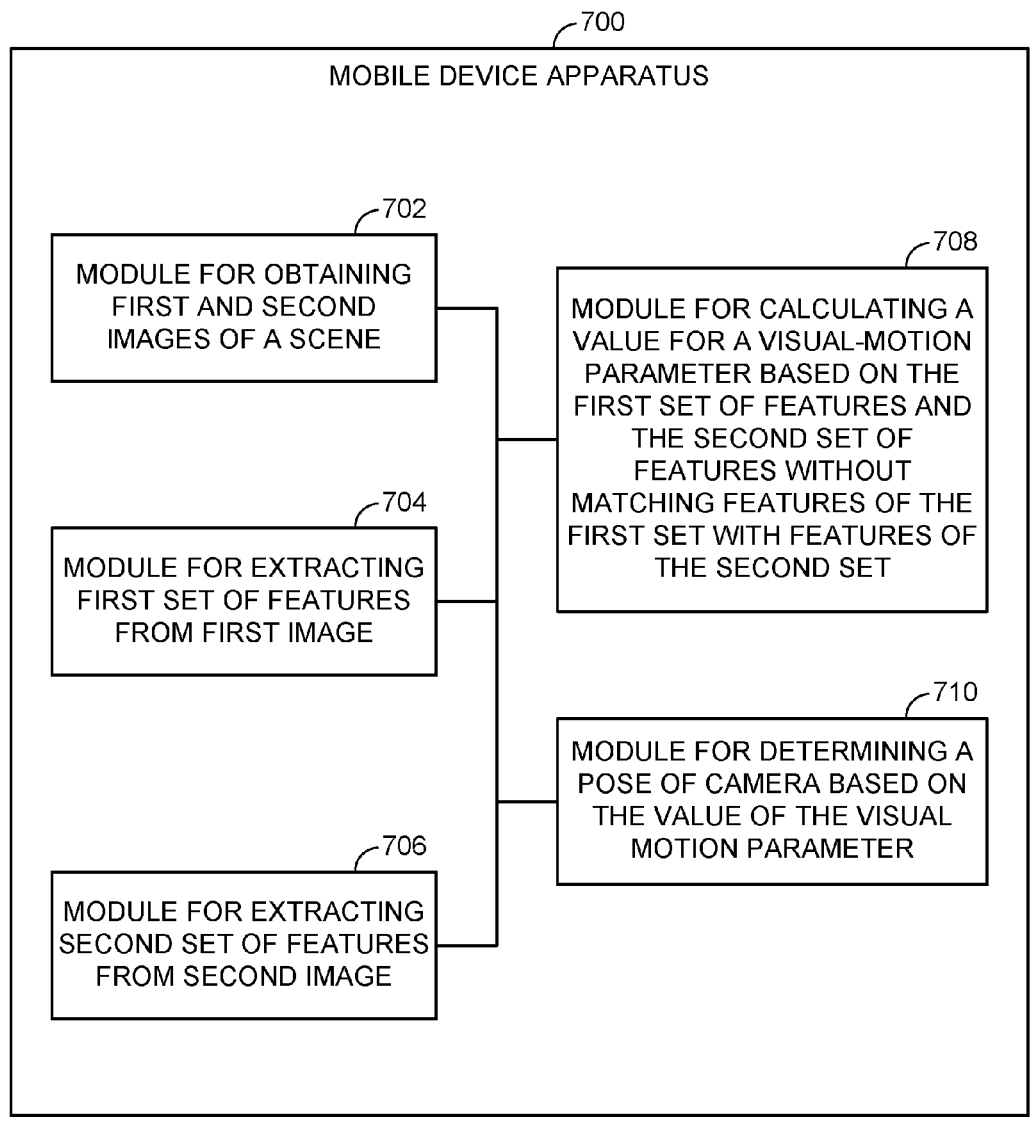
FIG. 7 is a diagram illustrating a mobile device apparatus configured to perform the processes discussed herein.

FIG. 7 illustrates several sample aspects of components that may be employed in a mobile device apparatus 700 configured to support the pose determination, as taught herein. Mobile device apparatus 700 is one possible implementation of mobile device 500 of FIG. 5 and/or mobile device 602 of FIG. 6.

A module 702 for obtaining first and second images of a scene may correspond at least in some aspects to, for example, a camera 502 and/or a network adapter 516 of FIG. 5. A module 704 for extracting a first set of features from the first image may correspond at least in some aspects to, for example, feature extractor 517 and/or processing unit 508 of FIG. 5. A module 706 for extracting a second set of features from the second image may correspond at in some aspects to, for example, feature extractor 517 and/or processing unit 508 of FIG. 5. A module 708 for calculating a value for a visual-motion parameter based on the first set of features and the second set of features without matching features of the first set with features of the second set may correspond at in some aspects to, for example, motion detector 518 and/or processing unit 508 of FIG. 5. A module 710 for determining a pose of a camera based on the value of the visual-motion parameter may correspond at in some aspects to, for example, feature extractor motion detector 518 and/or processing unit 508 of FIG. 5.

The functionality of the modules 702-710 of FIG. 7 may be implemented in various ways consistent with the teachings herein. In some designs, the functionality of these modules 702-710 may be implemented as one or more electrical components. In some designs, the functionality of these modules 702-710 may be implemented as a processing system including one or more processor components. In some designs, the functionality of these modules 702-710 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects, one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a non-transitory computer readable media embodying a method for assisting or otherwise determining a position of a mobile device in a wireless communication network. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for determining a pose of a camera, the method comprising:
   obtaining a first image of a scene, wherein the first image is captured by the camera;
   obtaining a second image of the scene, wherein the second image is captured by the camera;
   extracting a first set of features from the first image;
   extracting a second set of features from the second image;
   calculating a value for a visual-motion parameter based on the first set of features and the second set of features without matching features of the first set with features of the second set, wherein calculating the value of the visual-motion parameter based on the first set of features and the second set of features without matching features of the first set with features of the second set comprises:
      deriving a cost function for matching each feature in the first set of features with each feature in the second set of features;
      creating a matrix encoding the cost of matching features from the first set to the second set for a plurality of possible values of the visual-motion parameter; and
      optimizing the cost function to determine the value of the visual-motion parameter, wherein optimizing the cost function comprises:
         selecting a plurality of candidate motion models;
         calculating a plurality of cost function values of the cost function for the plurality of candidate motion models; and
         determining the value of the visual-motion parameter based on the plurality of cost function values; and
   determining the pose of the camera based, at least, on the value of the visual-motion parameter.

2. The method of claim 1, wherein the matrix is arranged into rows, corresponding the first set of features, and into columns, corresponding to the second set of features.

3. The method of claim 1, wherein the matrix further encodes additional costs corresponding to a possibility that at least one feature of the first set of features or at least one feature of the second set of features does not have a match.

4. The method of claim 1, wherein deriving the cost function comprises determining a permanent of the matrix.

5. The method of claim 4, wherein an approximation method is used to estimate the permanent of the matrix.

6. The method of claim 1, wherein selecting the plurality of candidate motion models comprises:
   applying a linear approximation for a permanent of the matrix;
   obtaining a first approximation for the value of the visual-motion parameter by solving a version of the cost function; and
   adding the first approximation to the plurality of candidate motion models.

7. The method of claim 6, wherein determining the value of the visual-motion parameter based on the plurality of cost function values comprises selecting a value of the visual-motion parameter corresponding to a best cost function value of the plurality of cost function values.

8. The method of claim 1, wherein the visual-motion parameter is at least one parameter selected from the group consisting of a homography, a fundamental matrix, a rigid transformation between two sets of points, essential matrices, affine transformation, and projective transformation.

9. A mobile device, the mobile device comprising:
   a camera;
   memory adapted to store program code; and
   a processing unit coupled to the memory to access and execute instructions included in the program code to direct the mobile device to:
      capture a first image of a scene with the camera;
      capture a second image of the scene with the camera;
      extract a first set of features from the first image;
      extract a second set of features from the second image;
      calculate a value for a visual-motion parameter based on the first set of features and the second set of features without matching features of the first set with features of the second set, wherein the instruction to calculate the value of the visual-motion parameter based on the first set of features and the second set of features without matching features of the first set with features of the second set comprises instructions to:
         derive a cost function for matching each feature in the first set of features with each feature in the second set of features;

create a matrix encoding the cost of matching features from the first set to the second set for a plurality of possible values of the visual-motion parameter; and optimize the cost function to determine the value of the visual-motion parameter, wherein the instructions to optimize the cost function comprises instructions to:

select a plurality of candidate motion models;

calculate a plurality of cost function values of the cost function for the plurality of candidate motion models; and determine the value of the visual-motion parameter based on the plurality of cost function values; and determine a pose of the camera based, at least, on the value of the visual-motion parameter.

10. The mobile device of claim 9, wherein the matrix is arranged into rows, corresponding the first set of features, and into columns, corresponding to the second set of features.

11. The mobile device of claim 9, wherein the matrix further encodes additional costs corresponding to a possibility that at least one feature of the first set of features or at least one feature of the second set of features does not have a match.

12. The mobile device of claim 9, wherein the instructions to derive the cost function comprises at least one instruction to direct the mobile device to determine a permanent of the matrix.

13. The mobile device of claim 12, wherein an approximation method is used to estimate the permanent of the matrix.

14. The mobile device of claim 9, wherein the instructions to select the plurality of candidate motion models comprises instructions to direct the mobile device to:

apply a linear approximation for a permanent of the matrix;

obtain a first approximation for the value of the visual-motion parameter by solving a version of the cost function; and add the first approximation to the plurality of candidate motion models.

15. The mobile device of claim 14, wherein the instructions to determine the value of the visual-motion parameter based on the plurality of cost function values comprises instructions to direct the mobile device to select a value of the visual-motion parameter corresponding to a best cost function value of the plurality of cost function values.

16. The mobile device of claim 9, wherein the visual-motion parameter is at least one parameter selected from the group consisting of a homography, a fundamental matrix, a rigid transformation between two sets of points, essential matrices, affine transformation, and projective transformation.

17. A non-transitory computer-readable medium including program code stored thereon for determining a pose of a camera, the program code comprising instructions to:

obtain a first image of a scene, wherein the first image is captured by the camera;

obtaining a second image of a scene, wherein the second image is captured by the camera;

extract a first set of features from the first image;

extract a second set of features from the second image;

calculate a value for a visual-motion parameter based on the first set of features and the second set of features without matching features of the first set with features of the second set, wherein the instruction to calculate the value of the visual-motion parameter based on the first set of features and the second set of features without matching features of the first set with features of the second set comprises instructions to:

derive a cost function for matching each feature in the first set of features with each feature in the second set of features;

create a matrix encoding the cost of matching features from the first set to the second set for a plurality of possible values of the visual-motion parameter; and optimize the cost function to determine the value of the visual-motion parameter, wherein the instructions to optimize the cost function comprises instructions to:

select a plurality of candidate motion models;

calculate a plurality of cost function values of the cost function for the plurality of candidate motion models; and determine the value of the visual-motion parameter based on the plurality of cost function values; and determine the pose of the camera based, at least, on the value of the visual-motion parameter.

18. The non-transitory computer-readable medium of claim 17, wherein the instructions to derive the cost function comprises at least one instruction to determine a permanent of the matrix.

19. The non-transitory computer-readable medium of claim 18, wherein the instructions to select the plurality of candidate motion models comprises instructions to:

apply a linear approximation for the permanent of the matrix;

obtain a first approximation for the value of the visual-motion parameter by solving a version of the cost function; and add the first approximation to the plurality of candidate motion models.

20. The non-transitory computer-readable medium of claim 19, wherein the instructions to determine the value of the visual-motion parameter based on the plurality of cost function values comprises at least one instruction to select a value of the visual-motion parameter corresponding to a best cost function value of the plurality of cost function values.

21. The non-transitory computer-readable medium of claim 17, wherein the visual-motion parameter is at least one parameter selected from the group consisting of a homography, a fundamental matrix, a rigid transformation between two sets of points, essential matrices, affine transformation, and projective transformation.

22. A mobile device, comprising:

means for obtaining a first image of a scene, wherein the first image is captured by a camera of the mobile device;

means for obtaining a second image of a scene, wherein the second image is captured by the camera;

means for extracting a first set of features from the first image;

means for extracting a second set of features from the second image;

means for calculating a value for a visual-motion parameter based on the first set of features and the second set of features without matching features of the first set with features of the second set, wherein the means for calculating the value of the visual-motion parameter based on the first set of features and the second set of features without matching features of the first set with features of the second set comprises:

means for deriving a cost function for matching each feature in the first set of features with each feature in the second set of features;

means for creating a matrix encoding the cost of matching features from the first set to the second set for a plurality of possible values of the visual-motion parameter; and means for optimizing the cost function to determine the value of the visual-motion parameter, wherein means for optimizing the cost function comprises:

means for selecting a plurality of candidate motion models;

means for calculating a plurality of cost function values of the cost function for the plurality of candidate motion models; and means for determining the value of the visual-motion parameter based on the plurality of cost function values; and means for determining a pose of the camera based, at least, on the value of the visual-motion parameter.

23. The mobile device of claim 22, wherein the visual-motion parameter is at least one parameter selected from the group consisting of a homography, a fundamental matrix, a rigid transformation between two sets of points, essential matrices, affine transformation, and projective transformation.

* * * * *